United States Patent
Krenz et al.

(10) Patent No.: US 7,508,322 B1
(45) Date of Patent: Mar. 24, 2009

(54) LARGE ERROR TO DESIRED PATH CORRECTION INDICATOR

(75) Inventors: Michael J. Krenz, Cedar Rapids, IA (US); Arlen E. Breiholz, Cedar Rapids, IA (US); Matthew J. Carrico, Mount Vernon, IA (US); Kenneth W. Mc Elreath, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 148 days.

(21) Appl. No.: 11/368,075

(22) Filed: Mar. 3, 2006

(51) Int. Cl.
*G01C 21/00* (2006.01)

(52) U.S. Cl. .................. 340/976; 340/971; 340/979; 340/972; 340/975; 701/302; 701/16

(58) Field of Classification Search .............. 340/971, 340/963, 945, 974, 976
See application file for complete search history.

(56) References Cited

U.S. PATENT DOCUMENTS

| | | | |
|---|---|---|---|
| 5,420,582 A * | 5/1995 | Kubbat et al. .............. 340/974 |
| 6,154,151 A | 11/2000 | McElreath | |
| 6,320,579 B1 * | 11/2001 | Snyder et al. ............... 345/419 |
| 6,885,313 B2 | 4/2005 | Selk | |
| 6,985,091 B2 * | 1/2006 | Price .......................... 340/975 |
| 2002/0089432 A1 * | 7/2002 | Staggs et al. ................ 340/945 |
| 2004/0015274 A1 * | 1/2004 | Wilkins et al. ................. 701/3 |
| 2005/0206533 A1 | 9/2005 | Rogers | |

* cited by examiner

*Primary Examiner*—Benjamin C. Lee
*Assistant Examiner*—Ojiako Nwugo

(57) ABSTRACT

A current path display indicator for a display device of a vehicle. The current path display indicator includes a flight path indicator (FPI) and a visual cue associated with the FPI to indicate relative direction from the vehicle's current path to a desired path. The visual cue may be embodied in possibly a number of different ways. For example, it may be embodied as an arrow extending from a circular portion of the FPI; a highlighted segment superimposed on the circular portion of the FPI; a triangle extending from the circular portion; or, a pie-shaped marker contained within the circular portion.

20 Claims, 2 Drawing Sheets

LARGE ERROR TO DESIRED PATH CORRECTION INDICATOR

BACKGROUND OF THE INVENTION

1. Field of the Invention

The present invention relates generally to electronic instrumentation such as flight control instrumentation, and more particularly to displays providing improving presentation of a vehicle's current flight path relative to a desired flight path.

2. Description of the Related Art

Effective flight management of aircraft is closely related to providing accurate and timely information to the pilot. This should be done in a manner that succinctly but accurately conveys to the pilot information important to the safe operation of the aircraft.

A principal flight instrumentation display is the Primary Flight Display (PFD) which shows information about course, speed, altitude, rate of climb and other information. The PFD is usually an electronic display such as a cathode ray tube or back-lit liquid crystal display.

Because of the already crowded and busy nature of the PFD screen, it is difficult to add new information in a manner that can be easily and quickly grasped by the pilot. In general, the new information almost always has to be placed in an already defined field on the display. However, it cannot replace unrelated essential information. For example, more detailed navigation information cannot be placed in the display area reserved for a different category of information such as speed, altitude, heading, etc.

Most navigation guidance systems fielded today offer guidance cues to either remain on track or get on the desired path with the assumption that the current position is within a nominal distance from the desired path. Guidance indications can be difficult to interpret when the desired path is significantly different from the current path (i.e. large discrepancy between desired and current path).

Examples of future path indicators in aircraft include, for example, U.S. Publication No. 20050206533, entitled "Aircraft Future Position and Flight Path Indicator Symbology," which discloses the use of programmable symbology that defines a series of geometric forms in the visual field of a pilot. The symbology includes a virtual representation of a predicted flight path of the aircraft and a virtual representation of a projected contact point with an external object, including the ground. The symbology also provides a virtual representation of a predicted flight path of the aircraft that is projected onto the ground below the projected flight path as a ground path predictor. The symbology further provides a critical slowing air speed indicator.

Various other patents describe vertical situation displays for aircraft. For example, U.S. Pat. No. 6,154,151, entitled "Integrated Vertical Situation Display for Aircraft", discloses an integrated vertical situation display (IVSD) for an aircraft, and method of displaying vertical situation information. The IVSD includes an electronic display for displaying the vertical situation of the aircraft, input interfaces for receiving vertical profile information signals, and a processing circuit for reading the information signals and generating display signals applied to the display therefrom. The display has a vertical profile view area to display the vertical situation in front of, above, and below the aircraft. The information sources may include a flight management system, traffic alert and collision avoidance system (TCAS) and a ground proximity warning system. Vertical situations are displayed by visual indicia representing, for example, aircraft position, path angle, flight path, waypoints, TCAS targets, altitude preselect, decision height, runway, ground contour, and vertical speed. The integrated display minimizes the cognitive workload of the operator in assessing the total vertical situation.

Present lateral deviation indicators and vertical deviation indicators are typically positioned about the periphery of the display. This presents difficulties for the pilot because the indicator may often point too high or too low.

The graphical presentation of the pitch and roll guidance commands on the PFD are referred to as the Flight Director (FD) and are generally shown as some type of overlay, such as, for example, a magenta wedge, on the skyball of the PFD. The pilot attempts to place a Flight Path Indicator on top of the Flight Director to achieve the desired path. The pilot manipulates the aircraft control so that the flight path follows the Flight Director. This enhances the ability of the pilot to manually fly the aircraft while following the desired path.

New developments in avionics include what is often referred to as the "highway-in-the-sky." Software to support this technology draws a series of boxes on the displays that appear to stay fixed in the sky as the airplane flies along its course. To stay on course the pilot flies through the boxes. This tunnel created by the boxes curves, tilts, rises or descends as the airplane flies along, allowing the pilot to follow a precise course all the way to touchdown. With the advent of highway-in-the-sky technology a new need arises for efficient cuing when the current position is outside of the nominal distance from the desired path.

SUMMARY OF THE INVENTION

In a broad aspect, the present invention is a current path display indicator for a display device of a vehicle. The current path display indicator includes a flight path indicator (FPI) and a visual cue associated with the FPI to indicate relative direction from the vehicle's current path to a desired path. The visual cue may be embodied in possibly a number of different ways. For example, it may be embodied as an arrow extending from a circular portion of the FPI; a highlighted segment superimposed on the circular portion of the FPI; a triangle extending from the circular portion; or, a pie-shaped marker contained within the circular portion. Although the present invention is particularly useful with aircraft, it can be used with other types of aerospace vehicles, and/water vehicles, or even simulation vehicles.

The present invention obviates the problems presently inherent when the desired path of a vehicle is significantly different than the current path. The pilot normally looks at the FPI for guidance information. With the present invention the visual cue is integrally associated with the FPI which makes it very easy to observe.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1A:
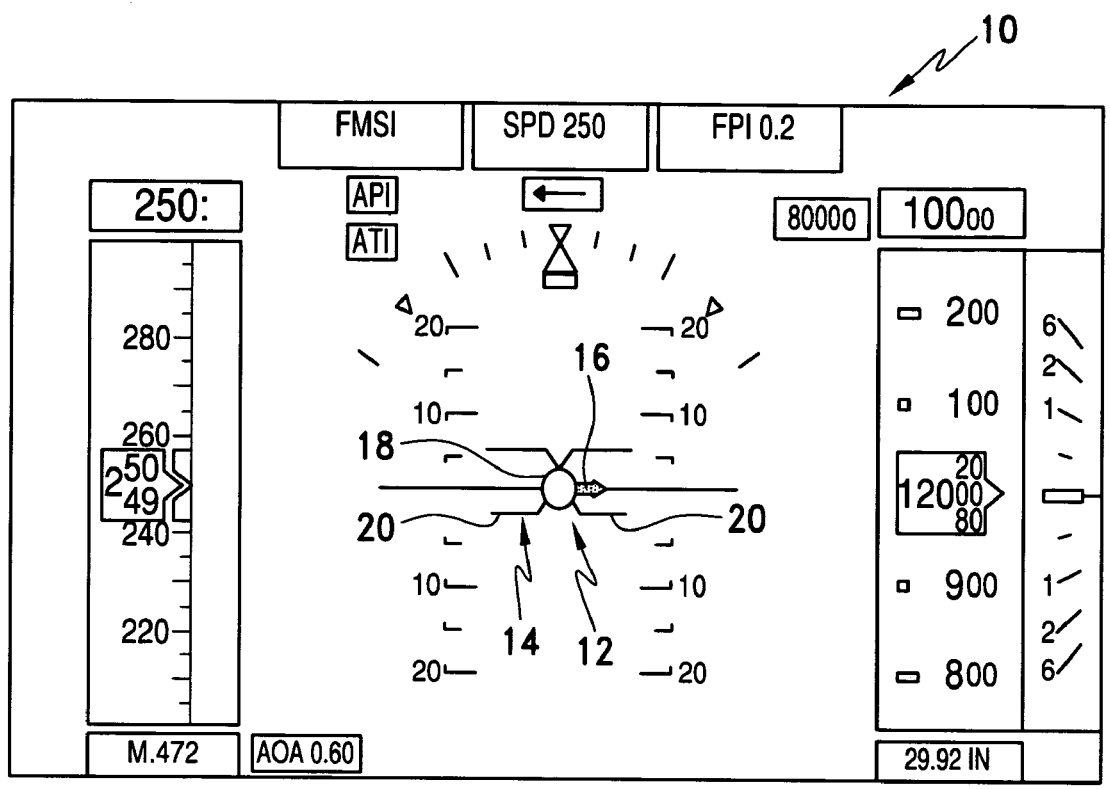
FIG. 1A is simplified schematic representation of a flight display of an aircraft, including a first embodiment of the current path display indicator of the present invention, wherein the visual cue is an arrow.

Referring now to the drawings and the characters of reference marked thereon. FIG. 1A illustrates a flight display for an aircraft, designated generally as 10, in accordance with the principles of the present invention. In addition to providing the course, speed, altitude, rate of climb and other typical vehicle operation indicators, the flight display 10 incorporates the display indicator, designated generally as 12, of the present invention. The display indicator 12, includes a flight path indicator (FPI) 14 and a visual cue (i.e. directional pointer) 16 associated with the FPI 14 to indicate relative direction from the vehicle's current flight path vector to the current desired path not currently visible on the display. The FPI 14 includes a circular portion 18 with two legs 20 extending therefrom.

Figure 1B:
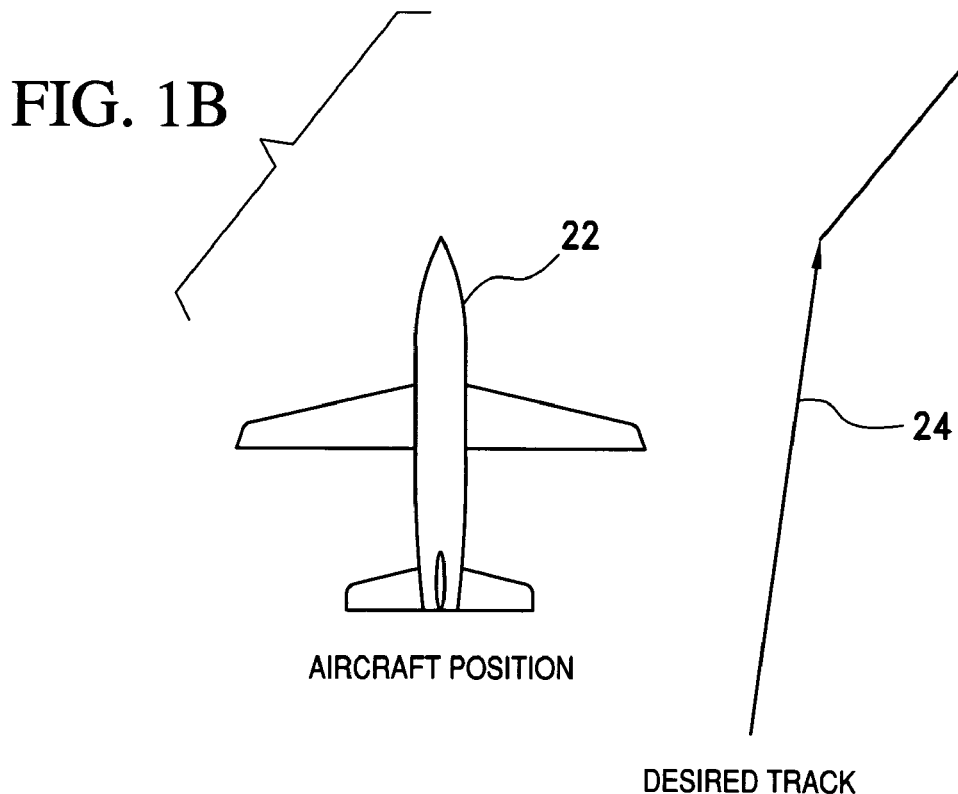
FIG. 1B is a reference figure showing the correlation of the aircraft position and desired track for the scenario shown in FIG. 1A.

In the embodiment shown in FIG. 1A the visual cue 16 is embodied as an arrow extending from the circular portion 18. In this example, the arrow 16 pointing due east indicates that the aircraft's current path is significantly different than the desired path. FIG. 1B shows the correlation of the aircraft position 22 and desired path 24 for the scenario shown by the current path display indicator 12 shown in FIG. 1A.

Figure 1C:
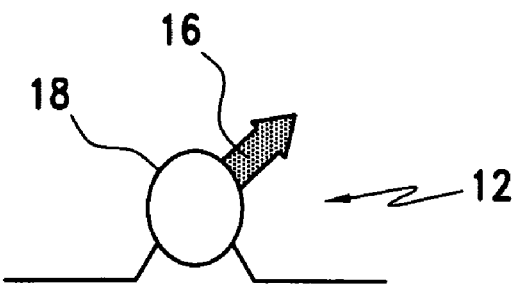
FIG. 1C illustrates the first embodiment of the current path display indicator, showing the desired path up and to the right.

FIG. 1C illustrates this visual cue 16 directed up and to the right to indicate that the aircraft's desired path is up and to the right.

The arrow can indicate to the pilot an approximate degree of correction to apply. That is, if the arrow points max left (pure horizontal) that would imply that no vertical correct was necessary, but a left turn was needed. Likewise, if the arrow points straight up, then no turn is required but a climb is needed. The typical Flight Director, discussed above, also provides cues of this nature, but its use is different. With a Flight Director, the operator attempts to place the Flight Path Indicator on top of the Flight Director to achieve the desired path. The present invention essentially provides an alternative to the typical Flight Director symbology. The current path display indicator of the present invention is much more compatible with Synthetic Vision including Highway-in-the-Sky symbology.

Figure 2A:
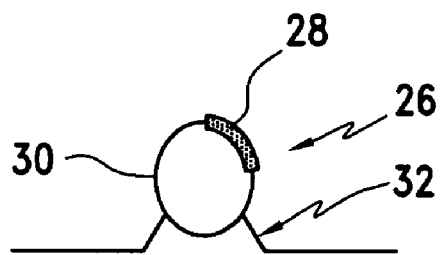
FIG. 2A illustrates a second embodiment of the current path display indicator, in which the visual cue is a highlighted segment.
Figure 2B:
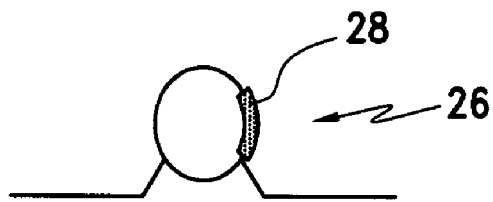
FIG. 2B illustrates the second embodiment of the current path display indicator, showing the desired path directly to the right.

Referring now to FIG. 2A another embodiment of a current path indicator is illustrated, designated generally as 26. In this embodiment the visual cue is a highlighted segment 28 superimposed on the circular portion 30 of the FPI 32. The desired path exists up and to the right. FIG. 2B shows the current path indicator 26 repositioned to be to the right. The highlighted segment 28 may be colored to enhance the visual impact.

Figure 3:
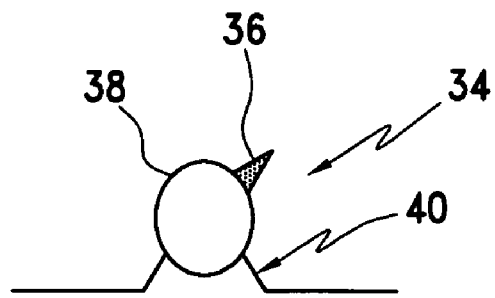
FIG. 3 illustrates a third embodiment of the current path display indicator, in which the visual cue is a triangle.

Referring now to FIG. 3 another embodiment of the current path indicator is illustrated, designated generally as 34. In this embodiment the visual cue is a triangle 36 extending from the circular portion 38 of the FPI 40.

Figure 4:
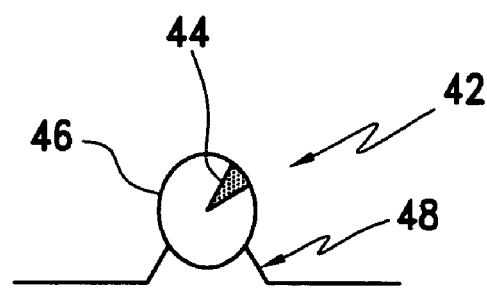
FIG. 4 illustrates a fourth embodiment of the current path display indicator, in which the visual cue is a pie-shaped marker.

FIG. 4 illustrates another embodiment of the current path indicator, designated generally as 42. In this instance, the visual cue is a pie-shaped marker 44 contained within the circular portion 46 of the FPI 48.

Although several embodiments of the visual cue have been described it is understood that it can be embodied in other forms relative to the current path display indicator. However, it remains integrally associated with the flight path indicator.

The current path indicator of the present invention may be used for both head-up displays and head-down displays. Furthermore, although particularly adaptable for use with aircraft displays, the current path indicator may be used for many different types of vehicles, such as automobiles, water vehicles, etc. Furthermore, the vehicle may be a simulated vehicle.

Other embodiments and configurations may be devised without departing from the spirit of the invention and the scope of the appended claims.

The invention claimed is:

1. A display indicator for a display device of a vehicle that depicts a synthetic vision, comprising:
   a) a flight path indicator (FPI) depicted on a synthetic vision image on a display device; and,
   b) a visual cue, comprising a directional pointer associated with said FPI to indicate relative direction from the vehicle's current flight path vector to the current desired path not displayed on the display device.

2. The current path display indicator of claim 1, wherein:
   a) said FPI comprises a circular portion; and
   b) said visual cue comprises a highlighted segment superimposed on said circular portion.

3. The current path display indicator of claim 2, wherein said highlighted segment is colored.

4. The current path display indicator of claim 1, wherein:
   a) said FPI comprises a circular portion; and,
   b) said visual cue comprises an arrow extending from said circular portion.

5. The current path display indicator of claim 1, wherein:
   a) said FPI comprises a circular portion; and,
   b) said visual cue comprises a triangle extending from said circular portion.

6. The current path display indicator of claim 1, wherein:
   a) said FPI comprises a circular portion; and,
   b) said visual cue comprises a pie-shaped marker contained within said circular portion.

7. The current path display indicator of claim 1, wherein said display device comprises a head-up display.

8. The current path display indicator of claim 1, wherein said display device comprises a head-down display.

9. The current path display indicator of claim 1, wherein said visual cue is operator selectable.

10. The current path display indicator of claim 1, wherein said display device of a vehicle is a display device for an aircraft.

11. A display device of a vehicle, comprising:
    a display indicator for a display device of a vehicle that depicts a synthetic vision, comprising:
       a flight path indicator (FPI) depicted on a synthetic vision image on a display device; and,
       a visual cue, comprising a directional pointer associated with said FPI to indicate relative direction from the vehicle's current flight path vector to the current desired path not displayed on the display device; and,
    a plurality of additional vehicle operation indicators.

12. The display device of claim 11, wherein:
    a) said FPI comprises a circular portion; and,
    b) said visual cue comprises a highlighted segment superimposed on said circular portion.

13. The display device of claim 12, wherein said highlighted segment is colored.

14. The display device of claim 11, wherein:

a) said FPI comprises a circular portion; and,
b) said visual cue comprises an arrow extending from said circular portion.

15. The display device of claim 11, wherein:
a) said FPI comprises a circular portion; and,
b) said visual cue comprises a triangle extending from said circular portion.

16. The display device of claim 11, wherein:
a) said FPI comprises a circular portion; and,
b) said visual cue comprises a pie-shaped marker contained within said circular portion.

17. The display device of claim 11, wherein said display device comprises a head-up display.

18. The display device of claim 11, wherein said display device comprises a head-down display.

19. The display device of claim 11, wherein said visual cue is operator selectable.

20. The current path display indicator of claim 11, wherein said display device of a vehicle is a display device for an aircraft.

* * * * *